US009370902B2

(12) United States Patent
Barnell et al.

(10) Patent No.: US 9,370,902 B2
(45) Date of Patent: Jun. 21, 2016

(54) FIBER-REINFORCED EPOXY COMPOSITES AND METHODS OF MAKING SAME WITHOUT THE USE OF OVEN OR AUTOCLAVE

(71) Applicant: Cornerstone Research Group, Inc., Dayton, OH (US)

(72) Inventors: Thomas J. Barnell, Dayton, OH (US); Michael D. Rauscher, Beavercreek, OH (US); Rick D. Stienecker, Troy, OH (US); David M. Nickerson, Columbus, OH (US); Tat H. Tong, Bellbrook, OH (US)

(73) Assignee: Cornerstone Research Group, Inc., Dayton, OH (US)

( * ) Notice: Subject to any disclaimer, the term of this patent is extended or adjusted under 35 U.S.C. 154(b) by 119 days.

(21) Appl. No.: 14/045,400

(22) Filed: Oct. 3, 2013

(65) Prior Publication Data

US 2015/0099834 A1    Apr. 9, 2015

(51) Int. Cl.
| | |
|---|---|
| *B32B 27/04* | (2006.01) |
| *B32B 27/38* | (2006.01) |
| *C08J 5/24* | (2006.01) |
| *B29C 70/36* | (2006.01) |
| *C08G 59/50* | (2006.01) |
| *B29C 70/44* | (2006.01) |
| *B29K 63/00* | (2006.01) |
| *B29K 301/00* | (2006.01) |
| *B29C 37/00* | (2006.01) |
| *B29C 35/08* | (2006.01) |

(52) U.S. Cl.
CPC ........... *B29C 70/443* (2013.01); *B29C 37/0067* (2013.01); *B29C 37/0075* (2013.01); *B29C 2035/0822* (2013.01); *B29C 2035/0827* (2013.01); *B29C 2035/0877* (2013.01); *B29K 2063/00* (2013.01); *B29K 2301/00* (2013.01); *B29K 2901/00* (2013.01); *B29K 2905/00* (2013.01); *B29K 2907/04* (2013.01); *B29K 2909/02* (2013.01); *B29K 2909/08* (2013.01); *B29K 2911/14* (2013.01); *B29K 2995/0012* (2013.01); *B29K 2995/0013* (2013.01)

(58) Field of Classification Search
None
See application file for complete search history.

(56) References Cited

U.S. PATENT DOCUMENTS

| | | | |
|---|---|---|---|
| 4,167,430 A | 9/1979 | Arachi | |
| 4,936,939 A | 6/1990 | Woolum | |
| 4,944,824 A | 7/1990 | Gupta | |
| 5,569,508 A | 10/1996 | Cundiff | |
| RE37,920 E | 12/2002 | Moffatt et al. | |
| 6,752,190 B1 | 6/2004 | Boll et al. | |
| 7,192,634 B2 | 3/2007 | Carter et al. | |
| 8,163,209 B2 | 4/2012 | Glazebrook | |
| 8,308,889 B2 | 11/2012 | Glancy et al. | |
| 8,356,989 B2 | 1/2013 | Waldrop et al. | |
| 8,728,262 B2 | 5/2014 | Miller et al. | |
| 8,900,391 B2 | 12/2014 | Silcock et al. | |
| 2002/0022422 A1* | 2/2002 | Waldrop et al. | 442/179 |
| 2008/0197526 A1* | 8/2008 | Shafi et al. | 264/137 |
| 2009/0131556 A1 | 5/2009 | Honda et al. | |
| 2009/0189320 A1 | 7/2009 | Bolick et al. | |
| 2009/0252921 A1 | 10/2009 | Bottler et al. | |
| 2010/0143145 A1 | 6/2010 | Jones | |
| 2010/0196654 A1 | 8/2010 | Maheshwari | |
| 2011/0077328 A1 | 3/2011 | Valette et al. | |
| 2011/0139344 A1 | 6/2011 | Watson et al. | |
| 2011/0254196 A1 | 10/2011 | Vauchel et al. | |
| 2013/0096232 A1 | 4/2013 | Theophanous et al. | |
| 2013/0225788 A1* | 8/2013 | Meegan | 528/408 |
| 2014/0370237 A1 | 12/2014 | Ponsolle et al. | |
| 2015/0099834 A1 | 4/2015 | Barnell et al. | |

FOREIGN PATENT DOCUMENTS

| | | | |
|---|---|---|---|
| EP | 0 662 492 A1 | 7/1995 | |
| GB | 2 172 542 A | 9/1986 | |
| RU | 2488612 C1 * | 7/2013 | ............. C08L 63/00 |
| WO | 0054949 A2 | 9/2000 | |
| WO | WO 2013075716 A1 * | 5/2013 | ............. B29C 35/02 |

OTHER PUBLICATIONS

Machine translation of RU 2488612 C1, provided by Espacenet (no date).*

(Continued)

*Primary Examiner* — Michael J Feely (74) *Attorney, Agent, or Firm* — Dinsmore & Shohl LLP (57) ABSTRACT

Method embodiments for producing a fiber-reinforced epoxy composite comprise providing a mold defining a shape for a composite, applying a fiber reinforcement over the mold, covering the mold and fiber reinforcement thereon in a vacuum enclosure, performing a vacuum on the vacuum enclosure to produce a pressure gradient, insulating at least a portion of the vacuum enclosure with thermal insulation, infusing the fiber reinforcement with a reactive mixture of uncured epoxy resin and curing agent under vacuum conditions, wherein the reactive mixture of uncured epoxy resin and curing agent generates exothermic heat, and producing the fiber-reinforced epoxy composite having a glass transition temperature of at least about 100° C. by curing the fiber reinforcement infused with the reactive mixture of uncured epoxy resin and curing agent by utilizing the exothermically generated heat, wherein the curing is conducted inside the thermally insulated vacuum enclosure without utilization of an external heat source or an external radiation source.

23 Claims, 3 Drawing Sheets

(56) References Cited

OTHER PUBLICATIONS

Partial translation of RU 2488612 C1, provided by USPTO translations branch (no date).*

Technical Data Sheet for Stretchlon 700, provided by Airtech International, Inc (2013).*

Technical Data Sheet for DER 330, providedby Dow (no date).*

Barnell et al., "Evaluation of No-Oven, No-Autoclave Composite Manufacturing", Society for the Advancement of Material and Process Engineering with permission, Open Conference Systems, Long Beach, California May 6-9, 2013, http://www.memberjournal.com/SAMPE/index.php?conference.

Dierksen, "Optimization of High Temperature VARTM Process", Final Report, Nanotechnology and Material Systems REU, Summer of 2006, pp. 1-7.

Kado Corporation, "High Performance Composites", http://www.kado-corporation.com/html/en/technology.html, May 15, 2010.

Koutsos, V., Engineering properties of polymers; ICE Manual of Construction Materials; Jan. 2009; pp. 585-591; Institution of Civil Engineers.

International Search Report and Written Opinion dated Feb. 21, 2014 pertaining to International application No. PCT/US2013/065658.

Gardiner, "Resin-Infused MS-21 Wings and Wingbox", CompositesWorld, Jan. 1, 2014, http://www.compositesworld.com/articles/resin-infused-ms-21-wings-and-wingbox.

Dietsch et al, "No-oven, No-autoclave Composite Tool Fabrication", Society for the Advancement of Material and Process Engineering.

Miller et al., "Study of Out-time on the Processing and Properties of IM7/977-3 Composites", ntrs.nasa.gov/archive/nasa/casi.ntrs.nasa.gov/20110016052.pdf.

"Fabrication Methods", CompositesWorld, Jan. 1, 2014, http://www.compositesworld.com/articles/fabrication-methods.

"Fabrication Methods (2015)", CompositesWorld, Jan. 9, 2015, http://www.compositesworld.com/articles/fabrication-methods-2015.

Girardy et al., "An Innovative Composite Solution for Cost-effective Primary Aircraft Structures", JEC Composites Magazine, No. 80 Apr.-May 2013, pp. 36-38.

* cited by examiner

FIBER-REINFORCED EPOXY COMPOSITES AND METHODS OF MAKING SAME WITHOUT THE USE OF OVEN OR AUTOCLAVE

STATEMENT REGARDING FEDERALLY SPONSORED RESEARCH OR DEVELOPMENT

This invention was made with government support by The National Aeronautics and Space Administration (NASA) under Contract Numbers NNX11CE48P and NNX13CA31C. The government has certain rights in this application pursuant to the contract.

TECHNICAL FIELD

Embodiments of the present disclosure are generally related to fiber-reinforced epoxy composites and methods of making fiber-reinforced epoxy composites, and are specifically related to fiber-reinforced epoxy composites and methods of making fiber-reinforced epoxy composites without utilizing an external heat curing step.

SUMMARY

Composites are commonly used in structural applications where weight savings, fatigue resistance, corrosion resistance, and performance tailorability justify the replacement of traditional metal parts. However, the widespread use of composites, for example, fiber-reinforced epoxy composites, is hindered by conventional manufacturing limitations. The fabrication of most high-performance composite parts, which may be conducted through processes such as Vacuum Assisted Resin Transfer Molding (VARTM), Vacuum Infusion Process (VIP), Resin Transfer Molding (RTM), requires autoclaves and ovens of a size that can accommodate the parts and their tooling. Often, large composite structures must be made in smaller sections for assembly downstream in order to employ the capital equipment available and avoid the capital investments needed for large autoclaves or ovens; however, the making and assembly of smaller parts into a large structure increases labor cost and production time and complicates the design and analysis of the overall composite structure to be fabricated. In addition, the joining and bonding of smaller sections may lead to presence of weak points in the structure that are more prone to mechanical failure. When using tooling materials with coefficients of thermal expansion (CTEs) different from that of the composite part to be made, thermal cycles in ovens or autoclaves can create issues with maintaining dimensional tolerances i.e., the oven or autoclave curing steps may cause significant and undesirable dimensional changes during curing. When making composite tooling which is subsequently used to shape and produce composite parts, lack of dimensional control and tolerance are undesirable.

Low CTE Invar alloy (64 wt % Fe and 36 wt % Ni) metal tooling can be used to obtain high precision composite parts, but such a tool is expensive, heavy, difficult to handle, and requires extensive effort to machine. Furthermore, Invar has a high specific heat capacity which requires long cycle times in an oven or autoclave to cure high Tg composites i.e., composites having a Tg of at least 100° C. Consequently, the labor, time, material and energy cost for employing such tooling are significantly higher compared with using polymer tooling or other higher CTE metal tooling, such as aluminum.

Room temperature curing (i.e., no ovens, autoclaves or external heat sources) processes avoid issues with CTE mismatch in making composites with strict dimensional tolerance; however conventional room temperature cured epoxy composites can typically only achieve glass transition (Tg) temperatures of 60° C., which is indicative of a low performance composite ineffective for various industrial applications, for example, aerospace applications.

As a result, current fabrication processes have been ineffective at obtaining low cost, high performance composites which maintain suitable dimensional control, consequently, there is a need for improved processes of producing high performance (i.e. high Tg) fiber-reinforced epoxy composites, e.g., composites having a Tg of at least 100° C.

Accordingly, embodiments of the present disclosure are directed to fiber-reinforced epoxy composites having a glass transition temperature of at least 100° C. by utilizing a process which does not use any external heating sources or radiation sources. The present embodiments remove design restrictions imposed by autoclaves and ovens and offers significant cost and time saving over current composite tooling methods. Due to the efficiency of the manufacturing method and robust properties of the present composites, the present fiber-reinforced epoxy composites are suitable for various industrial applications. For example, and not by way of limitation, these industrial applications may include Heavy Lift Launch Vehicles, military and commercial aircraft, wind blades and towers, civil and automotive infrastructure, and marine vessels, and especially in the composite tooling industry.

In accordance with another embodiment of the present disclosure, a method for producing a fiber-reinforced epoxy composite is provided. The method comprises providing a mold defining a shape for a composite, applying a fiber reinforcement over the mold, covering the mold and fiber reinforcement thereon in a vacuum enclosure, creating a vacuum on the vacuum enclosure to produce a pressure gradient, insulating at least a portion of the vacuum enclosure with thermal insulation, infusing the fiber reinforcement with a reactive mixture of uncured epoxy resin and curing agent under vacuum conditions, wherein the reactive mixture of uncured epoxy resin and curing agent generates exothermic heat, and producing the fiber-reinforced epoxy composite having a glass transition temperature of at least about 100° C. by curing the fiber reinforcement infused with the reactive mixture of uncured epoxy resin and curing agent by utilizing the exothermically generated heat, wherein the curing is conducted inside the thermally insulated vacuum enclosure without utilization of an external heat source or an external radiation source.

Additionally, it is contemplated that the utilization of exothermic heat instead of external heat and radiation sources could also be incorporated into other composite fabrication techniques such as prepregging, hand lay-up technique, and the like. Without being bound by theory, the present process of utilizing this exothermic heat in composite fabrication techniques advantageously achieves high performance composites with stricter dimensional tolerance, while minimizing capital investment and cost.

In accordance with another embodiment of the present disclosure, a fiber-reinforced epoxy composite is provided. The fiber-reinforced epoxy composite defines a glass transition temperature of at least 100° C. and a dimensional change value of less than 2500 μm/m during the cure process.

BRIEF DESCRIPTION OF THE DRAWINGS

The following detailed description of the preferred embodiments of the present disclosure can best be understood when read in conjunction with the following drawings.

DETAILED DESCRIPTION

Embodiments of the present disclosure are directed to methods for producing fiber-reinforced epoxy composites without utilizing external or separate heating elements. As used herein, "external heating element" or "external heating source" includes ovens, autoclaves, hot air heating sources, heat blankets, resistive heaters, or the like that are conventionally used during curing steps, but are eliminated in the embodiments of the present disclosure. As further used herein, "external radiation element" or "external radiation source" includes infra-red lamps or heaters, ultra-violet (UV) light devices, electron beam (e-beam) curing devices, or the like that are also conventionally used during curing steps, but are eliminated in the embodiments of the present disclosure.

Figure 1:
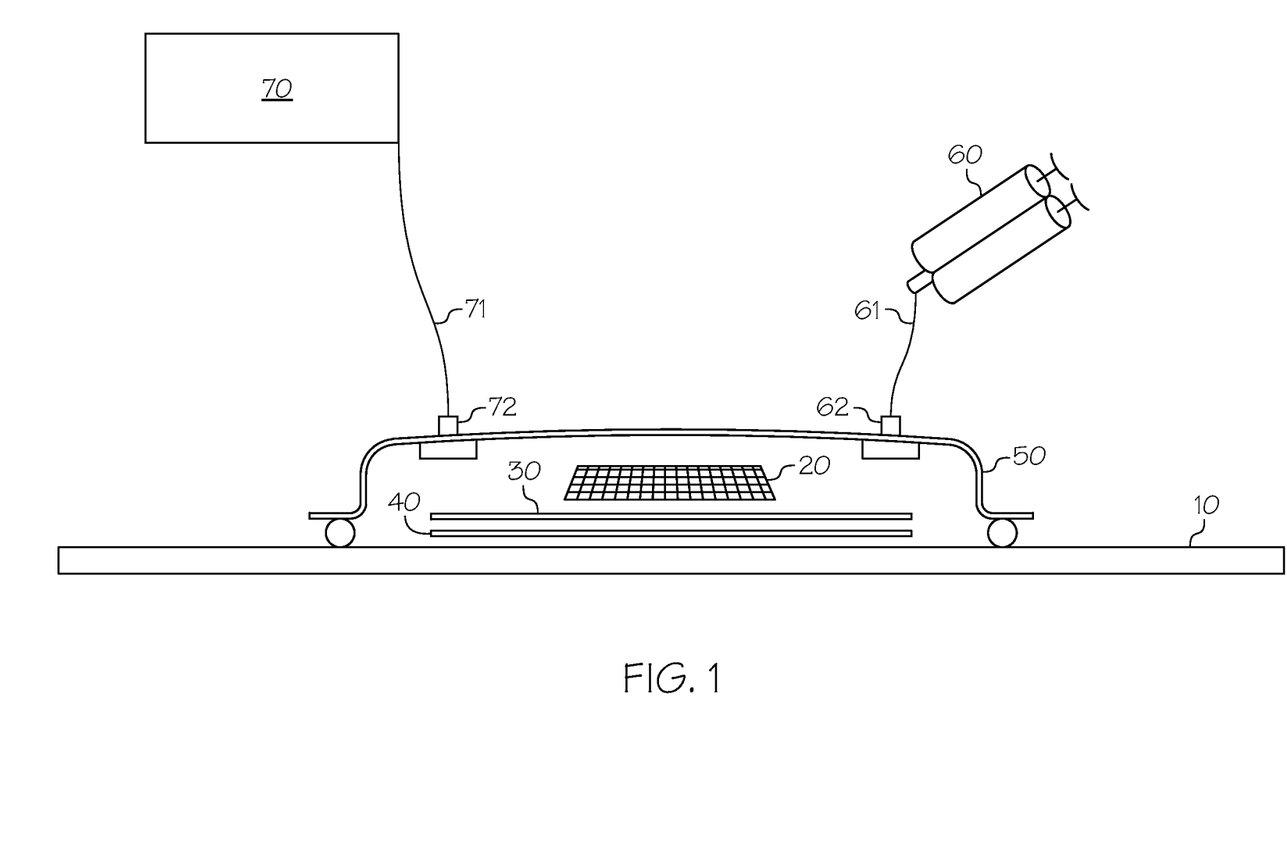
FIG. 1 is an exploded schematic view depicting the multiple layers and components utilized in the present infusion process according to one or more embodiments of the present disclosure.
Figure 3A:
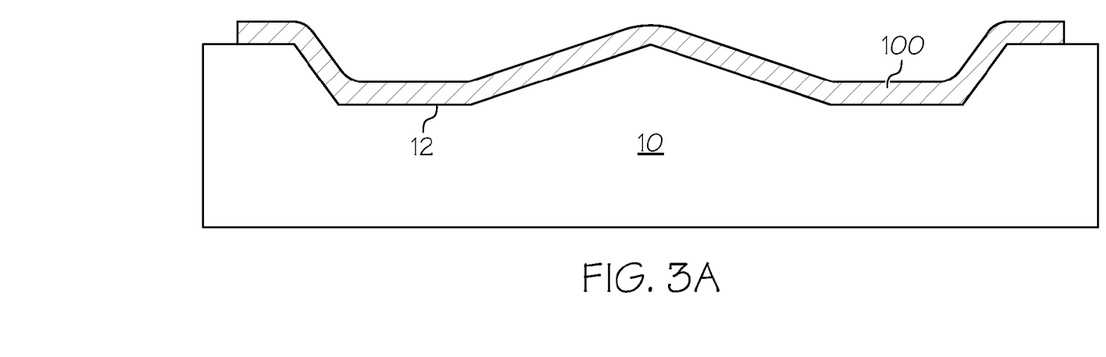
FIG. 3 is a schematic view depicting the present process for forming fiber-reinforced epoxy composite tooling and the process for forming subsequent parts from fiber-reinforced epoxy composite tooling according to one or more embodiments of the present disclosure.
Figure 3B:
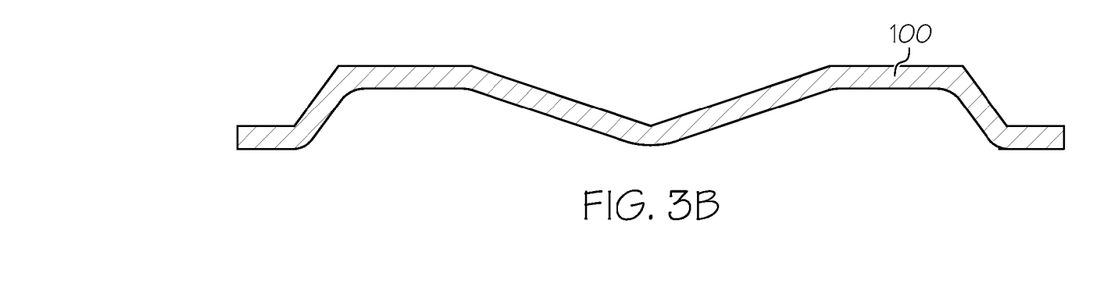
Figure 3C:
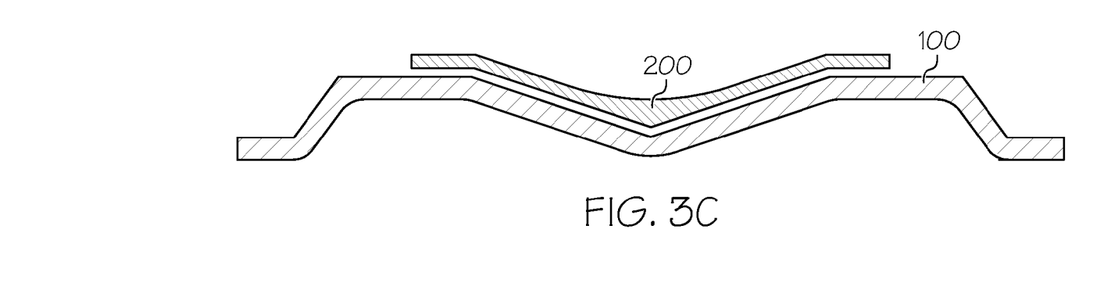

Referring to FIG. 1, the process for forming the fiber-reinforced epoxy composites comprises providing a mold 10 defining a shape for a composite. As shown in FIG. 3, the mold 10 may have one or more recessed regions 12 which are used to define the desired shape of the composite to be produced. As shown in the embodiments depicted in FIG. 3, the fiber-reinforced epoxy composites 100 by the mold 10 produced may be used composite tooling, which itself may be used as a mold for another composite part 200. However, for clarity in this application, "mold" is being used to define the frame used to shape the fiber-reinforced epoxy composites, which may in some embodiments be used as a composite tool.

Various materials are considered suitable for the mold 10. For example, the mold 10 may comprise at least one component selected from the group consisting of polymer, glass, ceramic, carbon-carbon composite, fiber-reinforced polymer composite, metal, wood, polymeric foam, ceramic foam, glass foam, syntactic foam, carbon foam, metal foam, a honeycomb structure, a sandwiched structure, and combinations thereof.

In one embodiment, the mold 10 comprises polymeric foam. For the polymer foam material, it is contemplated that at least one component of the foam is selected from the group consisting of polystyrene, epoxy, phenyl maleimide (PMI), polyetherimide (PEI), polyurethane, polyamide, nylon, acrylic, and combinations thereof. In an exemplary embodiment, a polyurethane foam mold is utilized.

Various properties may also be used to define the mold 10 of the present of disclosure. For example, the mold may have a specific heat capacity from 0.1 to 3.0 J/g.K. Polymeric molds may have a specific heat capacity of from about 1.0 to about 3.0 J/g.K, or from about 1.2 to about 2 J/g.K. Metal molds may have a specific heat capacity of from about 0.1 to about 1.2, or between about 0.2 to about 0.9 J/g.K.

Further, the mold may have a thermal conductivity from about 0.01 to about 0.2 W/m.K, or a thermal conductivity from about 0.01 to about 0.10 W/m.K, or from about 0.03 to about 0.07 W/m.K. Additionally, the mold may have a coefficient of thermal expansion from about 2 to about 80 ppm/° C., or from about 40 to about 60 ppm/° C. Further, the mold, for example, the polymeric foam mold, may have a density of from about 0.05 to about 0.5 g/cc, or from about 0.2 to about 0.35 g/cc. Moreover, the mold may have a glass transition temperature of from about 100 to about 500° C., or from about 120 to about 300° C., or from about 200 to about 250° C.

Optionally, it may be desirable to apply one or more coatings or layers (not shown) over the mold 10 prior to applying the fiber reinforcement 30 as shown in FIG. 1. As used herein, the terms "over" or "on" may mean directly adjacent or contacting another layer, but also contemplates that intervening layers may be disposed there between. In one or more embodiments, the mold 10 may include thereon a release layer 40, a face-sheet, a sealing coating, a non-stick coating, or combinations thereof. Generally, a release layer is applied over the mold 10 and generally attached to the mold 10. The release layer 40 may be used to seal the mold before the infusion. If the mold includes a sealing coating, an additional face-sheet or release layer may not be needed. After the infusion and curing process is conducted, the release layer may be used to separate the resulting cured fiber reinforcement composite from the mold. Various components are contemplated for the face-sheet, for example, carbon fiber-epoxy composite, metal, and combinations thereof. Generally, the face-sheet is applied over the mold using a suitable adhesive and/or tape.

Similarly, various compositions are contemplated for the sealing coating. In one embodiment, the sealing component comprises vinyl ester, and is applied via any suitable coating or deposition technique. Optionally, the sealing coating may also perform a non-stick function, which prevents the fiber reinforcement from sticking to the mold 10 during de-molding. Further as stated above, it is contemplated to use a non-stick or release coating which may comprise various suitable components. For example, the non-stick or mold release coating may be selected from the group consisting of silane, siloxane, polytetrafluoroethylene, hydrocarbon, and mixtures and combinations thereof. A suitable seal coating commercial embodiment in accordance with the present disclosure is Frekote® 55-NC™ produced by Henkel International.

Additionally, it is contemplated to use a combination of coatings or layers prior to the addition of the fiber reinforcement. In one embodiment, a seal coating and a mold release agent may be used together. For example, a suitable surface primer for sealing a mold surface, such as the Duratec Vinyl Ester Primer® from Hawkeye Industries, may be applied to seal the porous polymeric foam mold surface as an alternative to an adhesive release film, facesheet, or other sealing material. Then a mold release agent, such as Frekote 55-NC is applied thereon.

Subsequently, a fiber reinforcement 30 is applied over the mold. As used herein, the "fiber reinforcement" means one layer or multiple stacked fiber layers used as the substrate material for the epoxy resin infusion. The fiber layers may have various structures. For example and not by way of limitation, these structures may include random mats, scrims, chopped fibers, knits, unidirectional plies, three-dimensional weaves (3D weaves), three-dimensional fiber preforms (3D fiber preforms), and fabrics, such as plain weave, twill, harness satin. It is further contemplated to use combinations of the above structures. Depending on the industrial application and the part thickness desired, it may be desirable to use one layer or multiple layers for the fiber reinforcement 30. While the majority of the contemplated embodiments utilize up to 300 layers, the present process is suitable for greater than 300 fiber layers as well. In specific embodiments, the fiber reinforcement may include from 1 to 100 fiber layers, or from 1 to 30 fiber layers. For the fiber reinforcement 30 as shown in FIG. 1, various compositions are contemplated. For example, the fiber reinforcement 30 may comprise one or more components such as carbon fiber, glass fiber, aramid fiber, boron fiber, basalt fiber, polymer fiber, or combinations thereof. In a specific embodiment, the fiber reinforcement 30 may comprise one or more carbon fiber layers. While various commercial carbon fiber layers are considered suitable, one such suitable commercial carbon fiber layer is the Toho Tenax® HTS40 3K carbon fiber having a 2/2 twill fabric weaving construction.

Optionally, the present method may utilize the step of adding at least one mesh flow media 20 over the fiber reinforcement 30 to facilitate distribution and flow of the resin through the thickness of the fiber reinforcement 30. As would be familiar to one of ordinary skill in the art, flow media layer options are vast in design, material, and dimension. The defined channels of the flow media are generally uniform; however, it is contemplated to have differing channel diameters within the same flow media layer. In specific embodiments, the flow media layers may be layers comprised of woven material such as Style 6781 S2-Glass fabric from Fibre Glast, or non-woven materials. Examples of non-woven materials that can be used as flow media layers are knit material e.g. Breatherflow 60 from Airtech, pressed directional materials, such as Resinflow 60 from Airtech, random mats, such as Continuous Strand Mat from Fibre Glast, as well as other mesh or scrim material, or combinations thereof. Another commercially suitable embodiment is the GREENFLOW 75 produced by Airtech Advanced Materials Group. Various compositions are contemplated for use in the woven or non-woven structures. For example, the flow media may comprise nylon, polypropylene, propylene ethylene copolymer, aluminum screen material or combinations thereof. In a further optional embodiment, it is contemplated to use a peel-ply layer between the fiber reinforcement and the flow media.

Whether using flow media 20 or not, vacuum conduits and resin conduits are then applied and affixed over the fiber reinforcement 30, and the flow media 20. Referring to FIG. 1 and as used herein, "vacuum conduits" are tubing 71, tubing connectors 72, or other suitable components applied on the periphery of the mold 10 or fiber reinforcement 30, across the surface of the fiber reinforcement 30, or both, wherein the tubing 71 is connected to the vacuum 70 and is utilized to achieve a vacuum underneath the vacuum enclosure 50. Similarly as used herein, "resin conduits" are tubing 61, tubing connectors 62, or other suitable components applied on the periphery of the mold 10 or fiber reinforcement 30, across the surface of the fiber reinforcement 30, or both, wherein the tubing 61 is connected to the resin infusion device 60, which may be any suitable vessel. In a specific embodiment, the resin conduit delivers resin material across the thickness of the fiber reinforcement 30 via the flow media 20. Various materials are contemplated for the vacuum conduits and resin conduits. For example, flexible tubing such as a polyethylene tube may be utilized. In a further optional embodiment, it is contemplated to use multiple resin conduits for production of large composite part to shorten the time required for resin infusion.

Referring again to FIG. 1, the mold 10 and fiber reinforcement 30 are then covered in a vacuum enclosure 50. The vacuum enclosure 50 may encompass various components suitable for achieving a sealed environment, for example, a container or a polymer vacuum bagging film. The vacuum enclosure 50 is generally affixed to the periphery of the mold 10 via adhesive, tape, putty etc.

After the vacuum enclosure 50 is applied over the mold, the vacuum pump 70 is applied to remove air beneath the vacuum enclosure 50. Creating a vacuum on the vacuum enclosure 50 produces a pressure gradient. For example and not by way of limitation, the pressure gradient is from about 760 torr to about 1 torr. In addition to the use of a vacuum pump to generate the pressure gradient, it is further contemplated to use a pressurized system to generate the necessary pressure difference to infuse resin into the fiber reinforcement.

Figure 2:
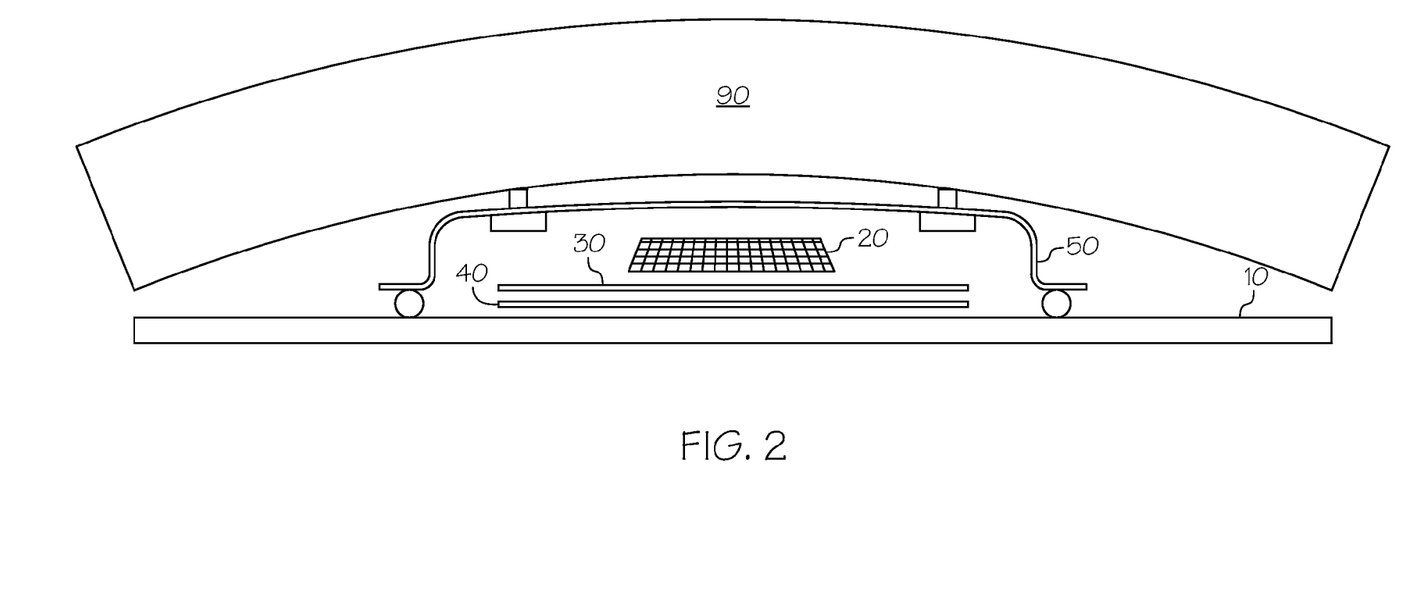
FIG. 2 is an exploded schematic view depicting the multiple layers and components utilized in the present curing process according to one or more embodiments of the present disclosure.

Additionally as shown in FIG. 2, the thermal insulation 90 may insulate at least a portion of the vacuum enclosure 50. In the specific embodiment shown in FIG. 2, the thermal insulation 90 may be applied over the top of the vacuum enclosure 50 and may be positioned to cover the fiber reinforcement 30. For example and not by way of limitation, the thermal insulation 90 may include fiberglass, cellulose, polymer foam, earth materials, and combinations thereof. Various polymer foams are considered suitable for thermal insulation. In one embodiment, the polymer foam comprises polyurethane foam. As would be familiar to the skilled person, earth materials may include pumice, vermiculite, asbestos, and the like. As will be described in greater detail below, the use of insulation in the present process reduces exothermic heat loss and thereby eliminates the need for the above-defined external heating elements utilized in the curing process. In one embodiment, the insulation may have a thermal conductivity from about 0.01 to about 0.2 W/m.K, or a thermal conductivity from about 0.01 to about 0.10 W/m.K, or from about 0.03 to about 0.07 W/m.K, or about 0.04 W/m.K.

After vacuum conditions have been achieved, a reactive mixture of uncured epoxy resin and curing agent may be infused into the fiber reinforcement 30. In specific embodiments, the reactive mixture of uncured epoxy resin and curing agent may be delivered from a resin infusion device 60 or vessel into the fiber reinforcement 30 via the resin conduit described above. For the infusion process, the uncured epoxy resin and curing agents may be mixed in a vessel prior to infusion. Generally, the uncured epoxy resin and curing agents are mixed two hours or less prior to infusion, but modifications to the procedure are contemplated. The uncured epoxy resin and curing agent are maintained at a temperature from about 10 to about 50° C., or from about 10 to about 35° C. prior to infusion. It is further contemplated to use separate uncured epoxy resin and curing agent feeds which react upon delivery to the fiber reinforcement. Alternatively, it is contemplated that the uncured epoxy resin and curing agent may be kept separate until mixed in the tubing 61 (i.e., static mixing) of the resin conduit.

The mixing of uncured epoxy resin and curing agent generates exothermic heat. In specific embodiments, the uncured epoxy resin has a high enthalpy of reaction as measured by differential scanning calorimetry (DSC), specifically, an enthalpy of reaction in the range of about 300 to about 1000 J/g, or about 500 to about 1000 J/g, or about 500 to about 800 J/g. In light of these higher enthalpies of reaction, there are higher exotherms produced by the reaction of uncured epoxy resin and curing agent. Without being bound by theory, the present high enthalpy uncured epoxy resins are traditionally viewed as difficult to handle because they are highly exothermic upon mixing with the curing agent, which may potentially lead to matrix degradation of the part. Further without being bound by theory, the enthalpy of the resin is matched with an appropriate thermal conductivity of the mold and overall insulation so that only a desirable amount of heat is generated to sufficiently heat the part to the target temperature for curing. If additional heat is supplied via conventional oven or autoclave processes, excessive exothermic heat may be generated thereby leading to undesirable matrix degradation of the part. In addition, the uncured epoxy resin may have a viscosity range of about 100 to about 1000 centipoise at 20° C., or about 200 to about 600 centipoise at 20° C.

Various compositions are contemplated for the uncured epoxy resin. For example and not by way of limitation, the uncured epoxy resin may comprise Diglycidyl ether of bisphenol A, diglycidyl ether of bisphenol F, resorcinol diglycidyl ether, N,N -Diglycidyl-4-glycidyloxyaniline, brominated diglycidyl ether of bisphenol A, novolac epoxy, tetraglycidyl meta-xylenediamine, 1,4-butanediol diglycidyl ether, 4,4'-Methylenebis(N,N-diglycidylaniline), tris(4-hydroxyphenyl)methane triglycidyl ether, tris(2,3-epoxypropyl)isocyanurate, or combinations thereof.

The curing agent, also called a hardener, may include various suitable components. In one embodiment, the curing agent may comprise amine curing agents. In specific embodiments, these amine curing agents may comprise 4,4'-Methylene-bis(2-chloroaniline), 4,4'-diaminodiphenyl sulfone, isophorone diamine, Diethyltoluenediamine, Dimethylthiotoluenediamine, 4,4'-diaminodiphenylmethane, 1,3'-phenylenediamine, piperazine, Triethylenetetramine, 5-Amino-1,3,3-trimethylcyclohexanemethylamine, m-Xylylenediamine, bis(p-aminocyclohexylmethane), 2,4-Diaminotoluene, N,N,dimethylethylenediamine, or combinations thereof. One suitable resin system is the epoxy-based resin system, NONA-001 produced by Cornerstone Research Group, specifically for NONA infusion processing.

While the present disclosure primarily discusses epoxy infused carbon composites, the present process is also applicable to various other high performance resins. For example, and not by way of limitation, these high performance resins may include bismaleimide, cyanate ester, polyimide, etc.

After infusion, the curing step is conducted to achieve the fiber-reinforced epoxy composite product, specifically an epoxy composite having a glass transition temperature of at least 100° C. Here, the curing step utilizes the exothermic heat generated by the reaction of uncured epoxy resin and curing agent to drive the curing process. Moreover, the thermal insulation ensures that the exothermic heat is maintained, and thereby eliminates the need for an alternative heating source such as an oven or autoclave.

Optionally, it is contemplated to include a radiative insulation sheet (not shown) over the vacuum enclosure 50 and thermal insulation 90. The radiative insulation sheet minimizes heat loss caused by radiation. In that way, the insulation sheet may work synergistically with the thermal insulation that reduces conductive heat loss while the radiative insulation sheet reduces heat loss via radiation. Various materials are contemplated for use in the radiative insulation sheet. In one embodiment, the radiative insulation sheet is aluminum foil.

The curing step may be controlled and optimized so that the curing may occur over a period from about 1 minute to about 8 hours, or from about 30 minutes to 6 hours, or from about 1 hour to 4 hours. After curing, the resultant composite is a fiber-reinforced epoxy composite having a glass transition temperature of at least about 100° C., or from about 100 to about 300° C., or from about 120 to about 210° C., or from about 150 to about 210° C., or at least about 180° C. Moreover, the cured fiber-reinforced epoxy composite defines a curing dimensional change value (i.e. deviation in dimensions of cured composite from the original dimensions of the tool surface at ambient temperature) of less than about 2500 μm/m, or less than about 2000 μm/m, or less than about 1500 μm/m. Without being bound by theory, the present curing process yields a more uniform curing profile, which provides advantages to the final product such as improved dimensional tolerance. Furthermore, the uniformity of internal heating by the resin exothermic heat also provides advantages in reducing residual stress within the composite and improving in-plane shear properties.

EXAMPLES

The following examples describe the curing profile of the present process and depict the reduction in residual stresses and improved dimensional tolerance of composite tooling produced by the present processes.

Such improvement in in-plane shear testing results are shown in Table 1 by comparison of the fiber reinforced composite fabricated in accordance with the present disclosure employing NONA-001 resin and fiber reinforcement (8 ply +/−45 3 k IM7 carbon fiber in a plain weave) with a composite fabricated with commercial Cycom 5215 prepreg produced by Cytec Engineered Materials and the same fiber reinforcement cured according to conventional oven cured process at 127 ° C. and postcured at 177 ° C. In the NONA-001 composite, the mold used was polyurethane foam tooling board sealed with adhesive Teflon, wherein the tooling board has a thermal conductivity of 0.06 W/m.K and a CTE of 49 ppm/° C.

TABLE 1

| | | Shear Modulus | | Shear strength at 5% strain | | Shear strength at offset | |
|---|---|---|---|---|---|---|---|
| Condition | Material | Mean, GPa | COV | Mean, MPa | COV | Mean, MPa | COV |
| CTD | NONA-001 | 6.42 | 5.72 | 98.1 | 6.00 | 70.3 | 3.71 |
| | Cycom 5215 | 4.69 | 1.71 | 87.8 | 1.90 | 59.4 | 2.01 |
| RTD | NONA-001 | 4.78 | 2.86 | 73.0 | 7.40 | 42.6 | 2.87 |
| | Cycom 5215 | 3.93 | 1.58 | N/A | N/A | 42.3 | 1.48 |
| ETW | NONA-001 | 3.12 | 5.90 | 47.0 | 5.76 | 22.2 | 5.56 |
| | Cycom 5215 | 2.69 | 4.10 | 41.4 | 4.07 | 24.9 | 4.37 |

CTD: Cold Temperature Dry;
RTD: Room Temperature Dry;
ETW: Elevated Temperature Wet;
COV: Coefficient of Variation Table 2 below lists the temperatures taken from the rheology experiment associated with gelation, vitrification, and maximum temperature reached, when producing a composite tool using the NONA-001 resin system produced by Cornerstone Research Group.

TABLE 2

| Event | Time after Infusion (min) | Temperature of fiber-reinforced epoxy composite (° C.) | Temperature of Foam Mold (bottom surface) (° C.) | Temperature of Foam Mold (average across the thickness) (° C.) |
|---|---|---|---|---|
| Gelation | 114 | 69 | 33 | 51 |
| Vitrification | 118 | 92 | 35.5 | 63.8 |
| Max. | 128 | 164 | 46 | 105 |

TABLE 2-continued

| Event | Time after Infusion (min) | Temperature of fiber-reinforced epoxy composite (° C.) | Temperature of Foam Mold (bottom surface) (° C.) | Temperature of Foam Mold (average across the thickness) (° C.) |
|---|---|---|---|---|
| temperature reached | | | | |

According to the data in Table 2, the bottom of the tool temperature is 35.5° C. at the time of part vitrification. At this point it can be assumed that the part has locked in its final dimensions. For simplicity, one could assume that the average temperature of the foam tool is 63.8° C. (average of 92.0° C. at top and 35.5° C. at bottom). By using this simple averaged temperature, the total change in temperature of the tool foam is 38.8° C. (63.8–25.0). Assuming the current polyurethane foam tooling board has a high CTE of 50×10–6/° C., the dimensional change would be 1938 μm/m. In comparison, conventional tooling materials require slow temperature ramps to encourage consistent curing throughout the laminate and avoid potentially trapped volatiles. For example, the Cycom™ 5215 Out-of-Autoclave (OoA) tooling prepreg system has a two hour cure (not including time to heat and cool the tooling) at 127° C., giving a total change in temperature of 102° C. (127–25). Referring to Table 3 below, the comparative example (Cycom 5215) is performed on the same tooling board as the inventive example (NONA-001); however, the comparative Cycom example has a dimensional change of 5100 μm/m, which is 2.5 times the dimensional change of the inventive example. Specifically, the inventive example undergoes significantly less dimensional change than the high temperature curing of the comparative example, thus producing part with greater precision in replicating the desired part geometry.

TABLE 3

| Example | Density (kg/m³) | CTE (ppm/° C.) | Temperature (initial) (° C.) | Temperature (vitrification) (° C.) | ΔT (° C.) | Dimensional Change μm/m |
|---|---|---|---|---|---|---|
| Inventive Example (NONA-001 resin) | <500 | 50.0 | 25.0 | 63.8 | 38.8 | 1938 |
| Comparative Example (Cycom 5215) | <500 | 50.0 | 25.0 | 127.0 | 102 | 5100 |

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for producing a fiber-reinforced epoxy composite comprising:
    providing a mold defining a shape for a composite;
    applying a fiber reinforcement over the mold;
    covering the mold and fiber reinforcement thereon in a vacuum enclosure;
    performing a vacuum on the vacuum enclosure to produce a pressure gradient;
    insulating at least a portion of the vacuum enclosure with thermal insulation;
    infusing the fiber reinforcement with a reactive mixture of uncured epoxy resin and an amine curing agent under vacuum conditions, wherein the reactive mixture of uncured epoxy resin and curing agent generates exothermic heat; and
    producing the fiber-reinforced epoxy composite having a glass transition temperature of at least about 100° C. by curing the fiber reinforcement infused with the reactive mixture of uncured epoxy resin and curing agent by utilizing the exothermically generated heat, wherein the curing is conducted inside the thermally insulated vacuum enclosure without utilization of an external heat source or an external radiation source.

2. The method of claim 1 wherein the mold comprises at least one component selected from the group consisting of polymer, glass, ceramic, carbon-carbon composite, fiber-reinforced polymer composite, metal, wood, polymeric foam, ceramic foam, glass foam, syntactic foam, carbon foam, metal foam, a honeycomb structure, a sandwiched structure, and combinations thereof.

3. The method of claim 1 wherein the mold comprises polymeric foam.

4. The method of claim 1 wherein the mold has a specific heat capacity from 0.1 to 3.0 J/g.K, and a thermal conductivity from 0.01 to 0.2 W/m.K.

5. The method of claim 1 wherein the mold further comprises a face-sheet, a sealing coating, a release coating, a non-stick coating, or combinations thereof.

6. The method of claim 1 wherein the fiber reinforcement comprises one or more components selected from the group consisting of carbon fiber, glass fiber, aramid fiber, boron fiber, basalt fiber, polymer fiber, and combinations thereof.

7. The method of claim 1 wherein the fiber reinforcement comprises random mats, scrims, chopped fibers, knits, unidirectional plies, three-dimensional weaves, three-dimensional fiber preforms, plain weave fabrics, twill fabrics, harness satin fabrics, or combinations thereof.

8. The method of claim 1 wherein the fiber reinforcement comprises prepreg material.

9. The method of claim 1 wherein the vacuum enclosure is a container or a polymer vacuum bagging film.

10. The method of claim 1 wherein the thermal insulation is selected from the group consisting of fiberglass, cellulose, polymer foams, earth materials and combinations thereof.

11. The method of claim 1 wherein the uncured epoxy resin has an enthalpy of reaction range of about 500 to about 800 J/g, and a viscosity range of from about 100 to about 600 centipoise at 20° C.

12. The method of claim 1 wherein the uncured epoxy resin comprises at least one component selected from the group consisting of Diglycidyl ether of bisphenol A, diglycidyl ether of bisphenol F, resorcinol diglycidyl ether, N,N-Diglycidyl-4-glycidyloxyaniline, brominated diglycidyl ether of bisphenol A, novolac epoxy, tetraglycidyl meta-xylenediamine, 1,4-butanediol diglycidyl ether, 4,4'-Methylenebis(N,N-diglycidylaniline), tris(4-hydroxyphenyl)methane triglycidyl ether, tris(2,3-epoxypropyl)isocyanurate, and combinations thereof.

13. The method of 1 wherein the amine curing agents comprise one or more components selected from the group consisting of 4,4'-Methylene-bis(2-chloroaniline), 4,4'-diaminodiphenyl sulfone, isophorone diamine, Diethyltoluenediamine, Dimethylthiotoluenediamine, 4,4'-diaminodiphenylmethane, 1,3'-phenylenediamine, piperazine, Triethylenetetramine, 5-Amino-1,3,3-trimethylcyclohexanemethylamine, m-Xylylenediamine, bis(p-aminocyclohexylmethane), 2,4-Diaminotoluene, N,N,dimethylethylenediamine, and combinations thereof.

14. The method of claim 1 wherein the uncured epoxy resin and curing agent are maintained at a temperature between 10 to 50° C. prior to infusion.

15. The method of claim 1 further comprising adding at least one mesh flow media over the fiber reinforcement.

16. The method of claim 1 further comprising applying a radiative insulation sheet over the vacuum enclosure.

17. The method of claim 1 wherein the curing occurs over a period from 1 minute to 8 hours.

18. The method of claim 1 wherein the fiber-reinforced epoxy composite is composite tooling.

19. A fiber-reinforced epoxy composite produced by the method of claim 1, wherein the fiber-reinforced epoxy composite experiences a curing dimensional change value of less than 2500 µm/m.

20. The fiber-reinforced epoxy composite of claim 19 wherein the curing dimensional change value is less than 2000 µm/m.

21. The fiber-reinforced epoxy composite of claim 19 wherein the fiber-reinforced epoxy composite has a glass transition temperature of from about 120 to about 210° C.

22. The fiber-reinforced epoxy composite of claim 19 wherein the fiber reinforcement comprises prepreg material.

23. The fiber-reinforced epoxy composite of claim 19 wherein the fiber-reinforced epoxy composite is composite tooling.

* * * * *